O. W. Stow,

Edging Sheet-Metal.

Nº 13,046. Patented June 12, 1855.

UNITED STATES PATENT OFFICE.

ORSON W. STOW, OF PLANTSVILLE, CONNECTICUT.

IMPROVEMENT IN SHEET-METAL-FOLDING MACHINES.

Specification forming part of Letters Patent No. 13,046, dated June 12, 1855.

*To all whom it may concern:*

Be it known that I, ORSON W. STOW, of Plantsville, in the county of Hartford and State of Connecticut, have invented a new and useful Improvement in Machines for Folding Sheet Metal; and I do hereby declare that the following is a full, clear, and exact description of the same, reference being had to the accompanying drawings, forming part of this specification, in which—

Figure 1:
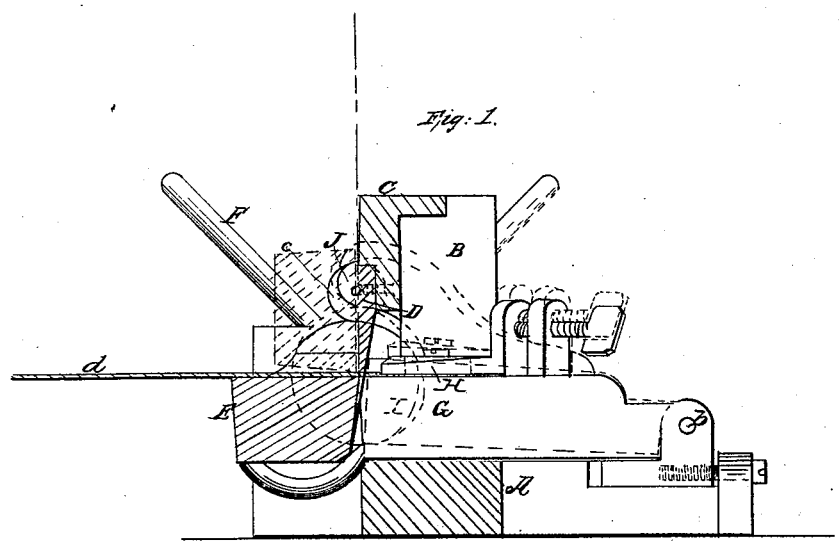
Figure 2:
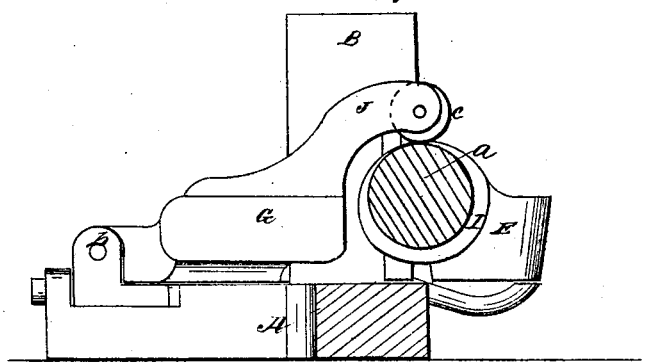

Figure 1 is a transverse section of a machine constructed according to my invention. Fig. 2 is an end view of the same, with one of the standards containing the bearing of the journal of the front folding-bar and supporting one end of the folding-plate cut away to show the manner of operating the folding-bars.

Similar letters of reference indicate corresponding parts in both figures.

This improvement relates to that description of folding-machines in which two folding-bars are used whose faces stand, previously to the folding operation, at right angles, or nearly so, to the folding-plate.

The improvement consists in so connecting or combining the two folding-bars that by motion given to one of them both are caused to move simultaneously to complete the fold or lap by a single movement.

A is the bed-plate.

B B are the standards, carrying the head C, to which the folding-plate D is secured, and containing the bearings for the journals $a$ of the front folding-bar, E, which carries a crank, F, by which it is turned in the usual manner from the position shown in black to that shown in red in Fig. 1.

G is the back folding-plate, hung on centers $b\ b$, so as to be capable of swinging upward from the position shown in black to that shown in red in Fig. 1.

H is the adjustable gage, secured to the plate G, to regulate the width of the lap.

I is a cam at one end of the front folding-bar, E, just within one of its journals, and J is an arm attached to the corresponding end of the back folding-bar and carrying a friction-roller, $c$, resting on the said cam.

The operation of the machine is as follows: The plate is laid upon the folding-bars under the folding-plate in the usual manner, as shown tinted in blue color, and indicated by $d$ in Fig. 1, and the workman then throws back the crank F from the position shown in black to that shown in red in Fig. 1, and in so doing not only throws up the front folding-bar, but at the same time by the action of the cam I upon the arm J raises the back folding-bar, G, and thus at one operation brings the plate to the position and condition shown by the strong red line in Fig. 1, thus completing the lap at one operation, instead of by first operating one folding-bar and then the other, as in the old machines of this character.

The simultaneous operation of the two folding-bars not only performs the work more quickly, but in a better manner than when the said bars operate one at a time, as the plate is not allowed by any possibility to slip from its place during the operation, and it will be observed that by this simultaneous action of the two folding-bars, necessarily and automatically, as it were, effected, the folding-plate D, which in close folds requires to be exceedingly thin, is better protected from being bent or broken by reason of the pressure, of necessity, being applied in a counteracting manner to both sides of it than is the case where either folding-bar is operated separately, or than is the case in those machines in which the folding of the plate is effected by a pinching-jaw forming the folding-plate, and which by cams or otherwise is set in motion to pinch or hold the edge of the plate while and simultaneously therewith a tumbler or single folding-bar bends the body of the plate over on it, moving the body of the plate through the half of a circle, or nearly so, and consequently consuming double the time to effect the fold, and to which machines—such as H. A. Koe's, patented on the 11th of September, 1845, and J. Walker's, patented 1st of April, 1851—the present invention has no reference as an improvement upon.

I do not claim as new the arrangement of the folding-bars at right angles, or thereabout, when open, to the folding-plate and effecting the fold by the movement of both bars to bend the edge and body of the plate on opposite sides of the stationary folding-plate or "former," as such an arrangement under a separate and disconnected operation of the bars is old; but I do claim as new and useful in folding-machines which have the folding-bars E and G arranged and operating in connection with a folding-plate, D, as described—

Effecting the simultaneous action of the two folding-bars by so connecting or driving them that upon operation being given to the one folding-bar the other folding-bar is set in corresponding action or motion thereby, whereby the folding-plate D is relieved from unequal and varying strain or pressure on its one side or face, the two folding-bars are necessitated to act in unison, and the one operative lever serves to set both folding-bars in motion as herein set forth.

In testimony whereof I have hereunto subscribed my name.

ORSON W. STOW.

Witnesses:
BYRON TWISS,
J. S. PHINNEY.